March 11, 1924.
J. IMPELLIZIERI
POWER TRANSMISSION DEVICE
Filed Aug. 1, 1922
1,486,754
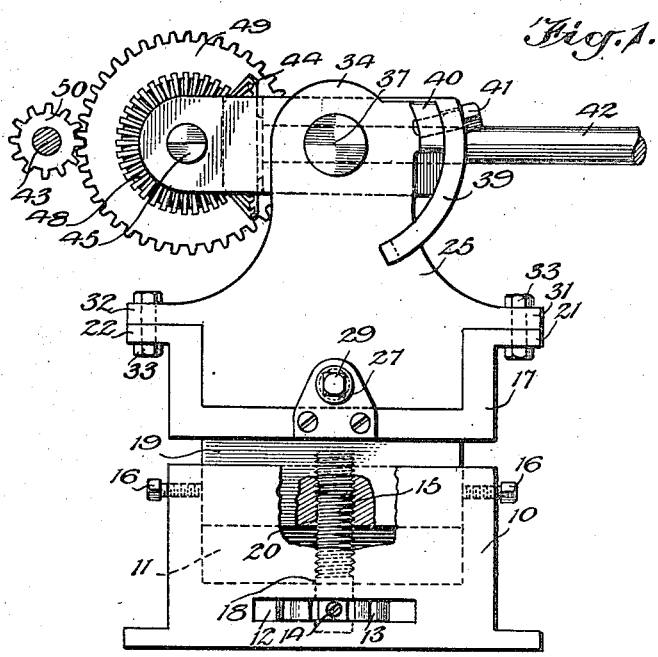
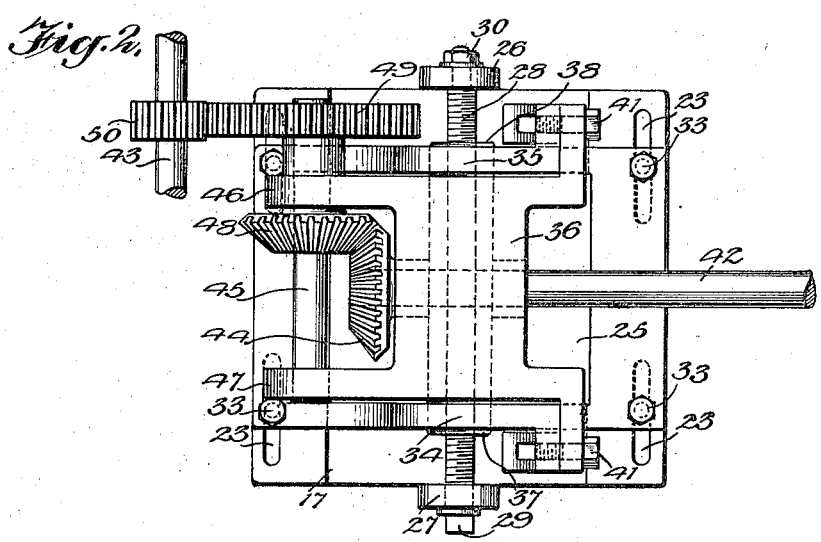
WITNESSES
INVENTOR
Joseph Impellizieri
BY
ATTORNEYS Patented Mar. 11, 1924.

1,486,754

UNITED STATES PATENT OFFICE.

JOSEPH IMPELLIZIERI, OF BROOKLYN, NEW YORK.

POWER-TRANSMISSION DEVICE.

Application filed August 1, 1922. Serial No. 578,928.

*To all whom it may concern:*

Be it known that I, JOSEPH IMPELLIZIERI, a subject of the King of Italy, and a resident of the city of New York, borough of Brooklyn, in the county of Kings and State of New York, have invented new and useful Improvements in Power-Transmission Devices, of which the following is a full, clear, and exact description.
This invention relates to power transmission devices.

In machine shops where there is a main shaft, sometimes difficulty is experienced in transmitting the power from the main shaft to the various machines. This difficulty arises from the fact that the machines are not on the same level as the power shaft, consequently, the power has to be transmitted through shafts at right angles to one another. An effort to overcome the above difficulty resulted in the development of the invention to be described hereinafter.

The general object of this invention is the provision of a simple and efficient power transmission shaft that may be adjusted to transmit power along different lines.

This object is accomplished by providing a power transmission shaft and a mounting for said shaft that will allow adjustment of the shaft in a vertical plane, and providing in conjunction with the mounting for said transmission shaft means for moving the mounting along vertical lines or in a horizontal plane.
This and other objects of the invention will be more clearly understood from the following detailed description and accompanying drawings.

Figure 1 is an end elevation of the power transmission mechanism with portions broken away to show the construction;

Figure 2 is a top plan view of the power transmission mechanism.

Referring to the above-mentioned drawings, a base 10 is shown with an opening 11 extending downward from its upper face. Extending through the base below the bottom of the opening 11 is a slot 12. Located in the slot 12 in alinement with an opening 18 is a nut 13 into which the end of a stud 15 fits. A set screw 14 is provided for attaching the nut to the stud 15. Projecting through the sides of the base 10 and above the bottom of the opening 11 are set screws 16.

A guide plate 17 having a plunger 19 formed on its lower face is located above the base 10. The plunger 19 is shaped to fit into the opening 11 in the base 10 and has an opening 20 extending upward in the plunger in alinement with the stud 15. When the plunger is placed with the opening 20 in alinement with the stud, and the stud rotated by means of the nut 13, the plunger is drawn downward into the opening 11 and it may be locked in any position by means of the set screw 16. Flanges 21 and 22 are provided on the guide plate 17 and extend outward. These flanges have slots 23 cut therein extending lengthwise of the guide plate 17. In the upper face of the guide plate a groove 24 is formed, in which a bearing block 25 is slidably mounted. Attached to each end of the guide plate are lugs 26 and 27 in which a bolt 28 is mounted. This bolt has a square head 29 on one end and a nut 30 mounted on the other end which is reduced in diameter and threaded. The portions of this bolt extending through the lugs 26 and 27 are not threaded, but the portion of the bolt extending between the lugs is threaded. This allows the bolt to rotate in the lugs. The bearing block 25 is provided with flanges 31 and 32 to seat on the flanges 21 and 22 of the guide plate 17. The body of the bearing block slides in the groove 24 formed in the guide plate 17. Bolts 33 are provided in conjunction with the bearing block 25 and extend through the flanges 31 and 32 and through the slots 23 provided in the flanges 21 and 22 of the guide plate 17. These bolts may be used for clamping the bearing block in any position relative to the guide plate. The threaded portion of the bolt 28 extends through a threaded opening extending lengthwise of the bearing block 25 and serves as a means for adjusting the bearing block along the groove 24 formed in the guide plate. This bearing block is made shorter in length than the distance between the lugs 26 and 27 so that it may be adjusted in a horizontal plane. Wings 34 and 35 extend upward from the bearing block. A power transmission shaft bearing 36, provided with trunnions 37 and 38, is pivotally mounted on these wings 34 and 35 so that it may swing about a horizontal axis. Arc-shaped plates 39 are attached to the bearing 36 and as the bearing is rotated about the horizontal axis these arc-shaped plates travel over arc-shaped projections 40 provided on the wings 34 and 35. A slot is provided in each arc-shaped plate 39, and set screws 41 which engage in threaded openings provided in the arc-shaped projections 40 slide in the slots provided in the arc-shaped plates 39 and may be used to clamp the plates 39 in position, thus retaining the bearing 36 in any desired position. A power transmission shaft 42 is rotatably mounted in the bearing 36.

In order to transmit the power from the main driving shaft 43 to the power transmission shaft 42 a train of gears is provided. The bearing 36 is provided with two arms 46 and 47 extending forward toward the main driving shaft. Rotatably mounted in these arms is a shaft 45 and a bevel gear 48 is keyed to the shaft 45. One end of this shaft 45 extends beyond the arm 46 and has a gear 49 mounted thereon. Mounted on the end of the power transmission shaft 42 is a bevel gear 44 which meshes with the bevel gear 48. A gear 50 mounted on the main driving shaft 43 meshes with the gear 49 mounted on the shaft 45. Thus power is transmitted from the main driving shaft 43, through the gears 50 and 49, shaft 45, bevel gears 48 and 44 to the power transmission shaft 42.

If it is desired to transmit power from the main driving shaft 43 to a machine or another shaft that has not the same elevation, the power transmission shaft 42 may be rotated in a vertical plane about the horizontal axis of the trunnions 37 and 38. If the swinging of the shaft 42 throws it out of alinement with the main driving shaft 43, then, by the operation of the stud 15, the bearing block 25 may be adjusted to move the shaft 42 into alinement with the shaft 43. If the base 10 has been set up in a position that does not place the gear 49 in alinement with the gear 50 by the operation of the bolt 28, the bearing block 25 may be moved in a horizontal plane to bring the gears 49 and 50 into alinement. From the above it will be evident that a power transmission mechanism has been provided which may be adjusted for the transmission of power along different lines to connect the shafts, or machines to shafts, when they are not in the same elevation.

I would state in conclusion that while the illustrated example constitutes a practical embodiment of my invention, I do not limit myself strictly to the exact details herein illustrated, since manifestly the same can be considerably varied without departing from the spirit of the invention as defined in the appended claims.

Claims:

1. An adjustable power transmission mechanism of the character described, comprising a hollow base, a plunger carrying a guide plate mounted in the hollow base, means for operating the plunger along vertical lines, a bearing block slidably mounted in the guide plate, means for adjusting the bearing block in a horizontal plane provided in conjunction with the guide plate, a shaft carried by the bearing block, and means mounted on the shaft for connecting it to a prime mover.

2. In a power transmission mechanism of the character described including a bearing block, a base for said bearing block comprising a hollow base block, a plunger mounted in said hollow base block for adjustment along vertical lines, a jack provided in conjunction with the base block and engaging the plunger for adjusting it, and a plurality of set screws mounted in the walls of the hollow base block for fixing the plunger in different positions.

3. In a power transmission mechanism of the character described including a guide plate carried by an adjustable base, a bearing block comprising a block slidably mounted in the guide plate, means for fixing the block in different relative positions with regard to the guide plate, wings extending upward formed integral with said block, a bearing pivotally mounted between said wings, a transmission shaft rotatably mounted in the bearing, means for transmitting power carried by said bearing, and means mounted on said transmission shaft for connecting it to said means for transmitting power.

4. In a power transmission mechanism including a bearing block adjustably mounted on an adjustable base, a device of the character described comprising a bearing pivotally mounted on said bearing block, a shaft rotatably mounted in the bearing, means for transmitting power attached to the bearing, means for connecting the shaft to the means for transmitting power, and means provided in conjunction with the bearing for fixing it in any position to which it may be rotated about its pivot points.

5. In a power transmission mechanism including a bearing block adjustably mounted on an adjustable base and provided with vertical lugs, a device of the character described comprising a bearing trunnioned in said lugs, a shaft rotatably mounted in said bearing, means carried by the bearing for transmitting power, means mounted on the shaft for connecting it to said power transmitting means, and means fixed to the bearing for retaining it in any position to which it may be rotated on its trunnions.

6. In a power transmission mechanism including an adjustable bearing block mounted on an adjustable base and provided with bearings for a shaft, a device of the character described comprising a shaft rotatably mounted in said bearings, a block mounted on said shaft, said block and shaft having an opening extending therethrough at right angles to the shaft, a transmission shaft mounted in said opening, means for transmitting power carried by the block, means mounted on the transmission shaft for connecting it to said means for transmitting power, and means attached to said block for fixing it in any position to which it may be rotated about said shaft.

7. A power transmission mechanism of the character described comprising a hollow base, a plunger mounted in said hollow base, means for adjusting the plunger in the base, a guide plate carried by said plunger, a bearing block slidably mounted in said guide plate, means for fixing said bearing block in any position relative to said guide plate, a shaft carried by the bearing block, a block mounted on said shaft, said shaft and block having an opening extending therethrough at right angles to the axis of the shaft, a transmission shaft rotatably mounted in said opening, means carried by the block for transmitting power, means mounted on the transmission shaft for connecting to the means for transmitting power, and means attached to the block for retaining it in any position to which it may be rotated about the axis of said shaft.

JOSEPH IMPELLIZIERI.